United States Patent
Hilditch et al.

(10) Patent No.: US 9,828,955 B2
(45) Date of Patent: Nov. 28, 2017

(54) SYSTEMS AND METHODS FOR DEDICATED EGR CYLINDER EXHAUST GAS TEMPERATURE CONTROL

(71) Applicant: Ford Global Technologies, LLC, Dearborn, MI (US)

(72) Inventors: James Alfred Hilditch, Canton, MI (US); Michael Howard Shelby, Plymouth, MI (US); Michael Damian Czekala, Canton, MI (US); Gregory Patrick McConville, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/356,267

(22) Filed: Nov. 18, 2016

(65) Prior Publication Data
US 2017/0067418 A1 Mar. 9, 2017

Related U.S. Application Data (62) Division of application No. 14/334,329, filed on Jul. 17, 2014, now Pat. No. 9,581,114.

(51) Int. Cl.
*F02D 41/14* (2006.01)
*F02M 26/06* (2016.01)
(Continued)

(52) U.S. Cl.
CPC ......... *F02M 26/43* (2016.02); *F02D 41/0002* (2013.01); *F02D 41/008* (2013.01);
(Continued)

(58) Field of Classification Search
CPC .... F02D 41/00; F02D 41/008; F02D 41/0052; F02D 41/0065; F02D 41/1475;
(Continued)

(56) References Cited

U.S. PATENT DOCUMENTS

| 5,279,515 A | 1/1994 | Moore et al. |
| 5,664,544 A | 9/1997 | Tomisawa |

(Continued)

FOREIGN PATENT DOCUMENTS

| WO | 2012108796 A1 | 8/2012 |
| WO | 2014005127 A2 | 1/2014 |

OTHER PUBLICATIONS

Potteau, Sebastian, et al., "Cooled EGR for a Turbo SI Engine to Reduce Knocking and Fuel Consumption," SAE Technical Paper Series No. 2007-01-3978, Powertrain & Fluid Systems Conference and Exhibition, Rosemont, Ill., Oct. 29-Nov. 1, 2007, 13 pages.

(Continued)

*Primary Examiner* — John Kwon
*Assistant Examiner* — Johnny H Hoang
(74) *Attorney, Agent, or Firm* — Julia Voutyras; McCoy Russell LLP (57) ABSTRACT

Systems and methods for increasing EGR gas temperature for an engine that includes at least one dedicated EGR cylinder. The dedicated EGR cylinder may provide exhaust gas to engine cylinders and the exhaust gas does not include exhaust gases from cylinders other than the dedicated EGR cylinder. The dedicated EGR cylinder may allow the engine to operate at higher EGR dilution levels.

6 Claims, 5 Drawing Sheets

(51) Int. Cl.
 *F02M 26/33* (2016.01)
 *F02D 41/00* (2006.01)
 *F02M 26/43* (2016.01)
 *F02P 5/04* (2006.01)
 *F02M 26/09* (2016.01)
 *F02M 26/25* (2016.01)

(52) U.S. Cl.
 CPC ..... *F02D 41/0052* (2013.01); *F02D 41/0065* (2013.01); *F02D 41/1475* (2013.01); *F02M 26/06* (2016.02); *F02M 26/09* (2016.02); *F02M 26/25* (2016.02); *F02M 26/33* (2016.02); *F02P 5/045* (2013.01); *F02D 2041/001* (2013.01); *Y02T 10/47* (2013.01)

(58) Field of Classification Search
 CPC .......... F02D 2041/00; F02D 2041/001; F02M 25/07; F02M 25/0749; F02M 26/06; F02M 26/09; F02M 26/25; F02M 26/33; F02M 26/43; Y02T 10/47
 USPC .............. 123/406.55, 406.7, 406.72, 568.12, 123/568.21; 701/103–105, 108
 See application file for complete search history.

(56) References Cited

U.S. PATENT DOCUMENTS

| | | | |
|---|---|---|---|
| 5,746,189 A | 5/1998 | Kuzuya et al. | |
| 5,937,807 A | 8/1999 | Peters et al. | |
| 6,053,154 A | 4/2000 | Pott | |
| 6,138,650 A | 10/2000 | Bailey | |
| 6,230,695 B1 | 5/2001 | Coleman et al. | |
| 6,266,957 B1 | 7/2001 | Nozawa et al. | |
| 6,293,246 B1 | 9/2001 | Tanahashi et al. | |
| 6,367,256 B1 * | 4/2002 | McKee | F02M 26/05 123/568.12 |
| 6,394,051 B1 | 5/2002 | Filipe et al. | |
| 6,397,790 B1 | 6/2002 | Collier, Jr. | |
| 6,405,720 B1 | 6/2002 | Collier, Jr. | |
| 6,499,449 B2 | 12/2002 | Michelini et al. | |
| 6,543,230 B1 | 4/2003 | Schmid | |
| 6,655,324 B2 | 12/2003 | Cohn et al. | |
| 6,681,171 B2 * | 1/2004 | Rimnac | F02B 29/0418 123/568.22 |
| 6,718,755 B2 | 4/2004 | Brehob | |
| 6,820,415 B2 | 11/2004 | Abet et al. | |
| 6,826,905 B2 | 12/2004 | Gui et al. | |
| 6,918,384 B2 | 7/2005 | Jehlik et al. | |
| 6,925,802 B2 | 8/2005 | Arnold | |
| 6,968,825 B2 | 11/2005 | Hitomi et al. | |
| 7,086,221 B2 | 8/2006 | Pott et al. | |
| 7,290,504 B2 | 11/2007 | Lange | |
| 7,779,812 B2 | 8/2010 | Leone et al. | |
| 7,942,127 B2 | 5/2011 | Leone et al. | |
| 8,041,500 B2 | 10/2011 | Leone | |
| 8,100,116 B2 | 1/2012 | He et al. | |
| 8,108,125 B2 | 1/2012 | Leone | |
| 8,150,605 B2 | 4/2012 | Doering et al. | |
| 8,230,843 B2 | 7/2012 | Kurtz | |
| 8,239,122 B2 | 8/2012 | Leone et al. | |
| 8,240,294 B2 | 8/2012 | Surnilla et al. | |
| 8,291,891 B2 | 10/2012 | Alger, II et al. | |
| 8,352,160 B2 | 1/2013 | Leone | |
| 8,352,164 B2 | 1/2013 | Leone et al. | |
| 8,511,084 B2 | 8/2013 | Ulrey et al. | |
| 8,539,768 B2 | 9/2013 | Hayman et al. | |
| 8,561,599 B2 | 10/2013 | Gingrich et al. | |
| 8,701,409 B2 | 4/2014 | Pursifull et al. | |
| 8,763,570 B2 | 7/2014 | Hayman et al. | |
| 8,893,687 B2 | 11/2014 | Gingrich et al. | |
| 9,470,162 B2 | 10/2016 | Martin et al. | |
| 9,534,567 B2 | 1/2017 | Ulrey et al. | |
| 2004/0079332 A1 | 4/2004 | Kotwicki | |
| 2004/0139949 A1 | 7/2004 | Koseki et al. | |
| 2006/0196469 A1 | 9/2006 | Kuo et al. | |
| 2009/0050117 A1 * | 2/2009 | Tai | F02B 29/0412 123/542 |
| 2009/0308070 A1 | 12/2009 | Alger, II et al. | |
| 2011/0041495 A1 | 2/2011 | Yager | |
| 2011/0253113 A1 | 10/2011 | Roth et al. | |
| 2012/0023937 A1 | 2/2012 | Styles et al. | |
| 2012/0078492 A1 | 3/2012 | Freund et al. | |
| 2012/0204844 A1 | 8/2012 | Gingrich et al. | |
| 2012/0222659 A1 | 9/2012 | Kulkarni et al. | |
| 2012/0260897 A1 | 10/2012 | Hayman et al. | |
| 2012/0285163 A1 | 11/2012 | Hayman et al. | |
| 2012/0285426 A1 | 11/2012 | Hayman et al. | |
| 2012/0285427 A1 | 11/2012 | Hayman et al. | |
| 2012/0323470 A1 | 12/2012 | Klingbeil et al. | |
| 2013/0047958 A1 | 2/2013 | Yamakawa et al. | |
| 2013/0220286 A1 | 8/2013 | Gingrich et al. | |
| 2014/0196703 A1 | 7/2014 | Boyer et al. | |
| 2015/0322904 A1 | 11/2015 | Leone et al. | |
| 2015/0354477 A1 | 12/2015 | Leone et al. | |
| 2015/0354482 A1 | 12/2015 | Leone et al. | |
| 2015/0361927 A1 | 12/2015 | Glugla | |

OTHER PUBLICATIONS

Alger, Terry, et al., "Dedicated EGR: A New Concept in High Efficiency Engines," SAE Technical Paper Series No. 009-01-0694, Southwest Research Institute, 12 pages.

* cited by examiner

SYSTEMS AND METHODS FOR DEDICATED EGR CYLINDER EXHAUST GAS TEMPERATURE CONTROL

CROSS REFERENCE TO RELATED APPLICATION

The present application is a divisional of U.S. patent application Ser. No. 14/334,329, entitled "SYSTEMS AND METHODS FOR DEDICATED EGR CYLINDER EXHAUST GAS TEMPERATURE CONTROL," filed on Jul. 17, 2014, the entire contents of which are incorporated herein by reference for all purposes.

FIELD

The present description relates to systems and methods for improving operation of an engine that operates with high levels of exhaust gas recirculation (EGR). The methods may be particularly useful for engines that include one or more dedicated EGR (DEGR) cylinders that provide external EGR to engine cylinders.

BACKGROUND AND SUMMARY

An engine may be operated with one or more dedicated EGR cylinders (e.g., a cylinder that directs at least a portion of its exhaust flow, without exhaust from other cylinders, to provide external EGR to engine cylinders) that direct all of their exhaust gas to the intake air of engine cylinders as external exhaust gas recirculation (EGR). This arrangement may allow the engine to operate with higher levels of exhaust gas dilution. Consequently, engine pumping work may be reduced and engine efficiency may be improved. The external EGR may also be directed through a cooler to reduce gas temperatures in the engine's cylinders, thereby making the engine less knock limited and further reducing NOx emissions. However, condensation may form within the EGR cooler, and the condensation may eventually be drawn into the engine where it may increase the possibility of engine misfire.

The inventors herein have recognized the above-mentioned disadvantages of operating a highly diluted engine and have developed a method for an engine, comprising: recirculating exhaust gas from only a dedicated EGR cylinder to an intake of engine cylinders; increasing exhaust gas temperature in the dedicated EGR cylinder via increasing an air-fuel ratio of the dedicated EGR cylinder in response to EGR cooler condensation; and operating remaining engine cylinders about a stoichiometric air-fuel ratio in response to EGR cooler condensation.

By increasing an air-fuel ratio of a cylinder that is operating rich to improve engine combustion stability of an engine that includes a dedicated EGR (DEGR) cylinder, it may be possible to increase EGR gas temperature and removed condensation from an EGR cooler. A DEGR cylinder may typically be operated at a rich air-fuel ratio to improve combustion stability in an engine's non-DEGR cylinders. However, if higher EGR gas temperature is desired based on EGR cooler condensation, a cool engine, and/or low engine speed and load, EGR gas temperature may be increased via increasing or making less rich an air-fuel mixture supplied to a DEGR cylinder. In addition, when the air-fuel ratio of the DEGR cylinder is increased, resulting in less fuel in the recirculated exhaust gas, the amount of fuel injected to each of the remaining cylinders may be increased to maintain a stoichiometric air-fuel ratio in the remaining cylinders. Additionally, in some examples, spark timing of the DEGR cylinder may be retarded as compared with spark timing of non-DEGR cylinders. In this way, EGR gas temperature may be increased without increasing exhaust temperature of non-DEGR cylinders.

The present description may provide several advantages. In particular, the approach may reduce the possibility of engine misfire by allowing EGR cooler condensation to be reduced. Further, the approach may provide faster engine warm-up, thereby reducing engine emissions. Further, the approach may improve engine efficiency at light engine loads.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
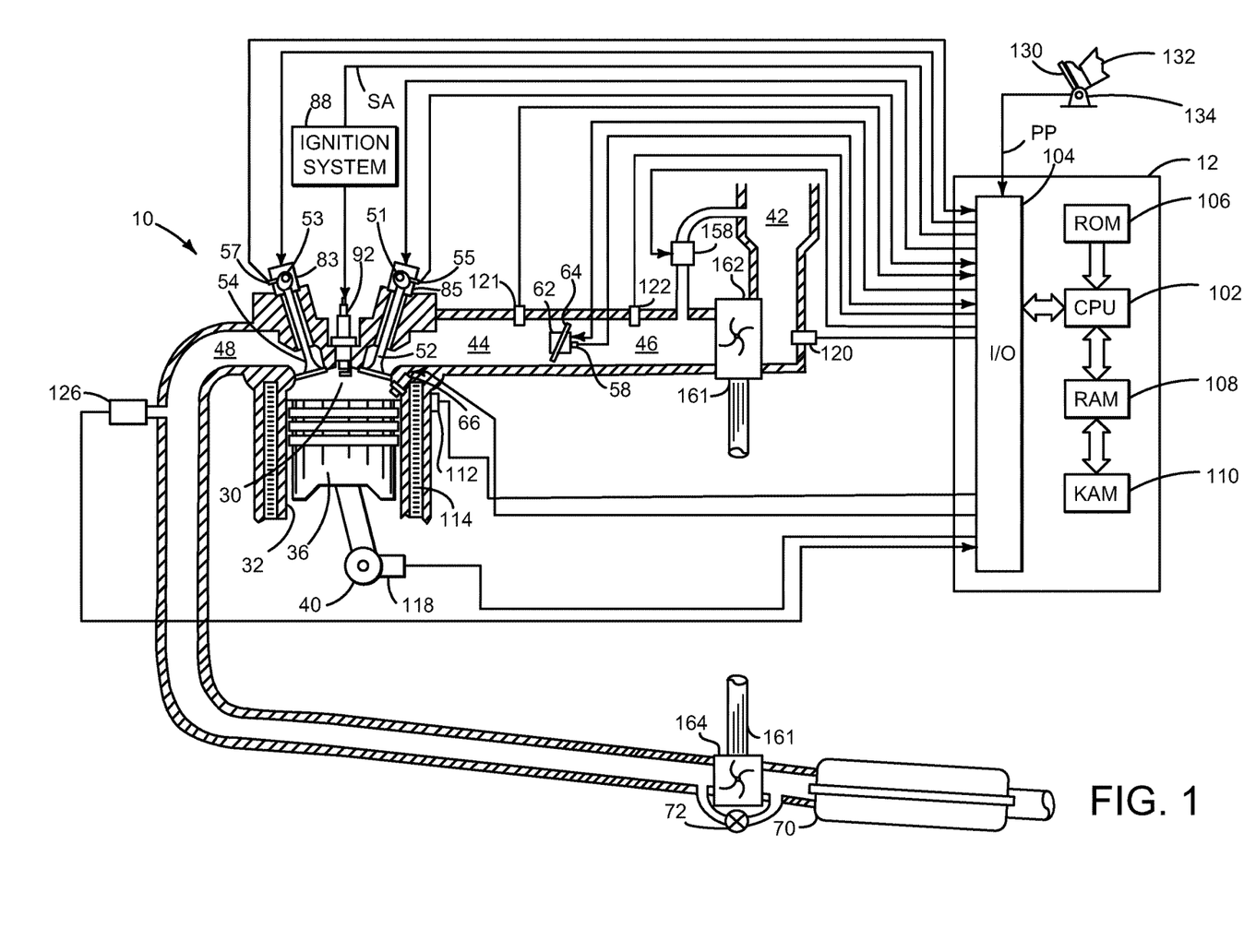
FIG. 1 is a schematic diagram of an engine.
Figure 2:
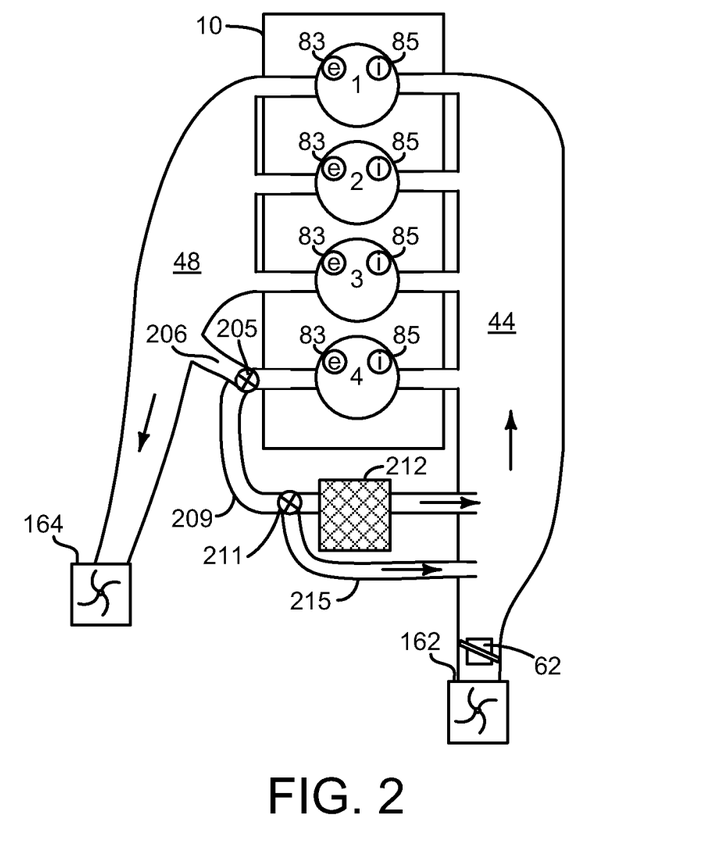
FIGS. 2-3 show example engine variations that include a DEGR cylinder.
Figure 3:
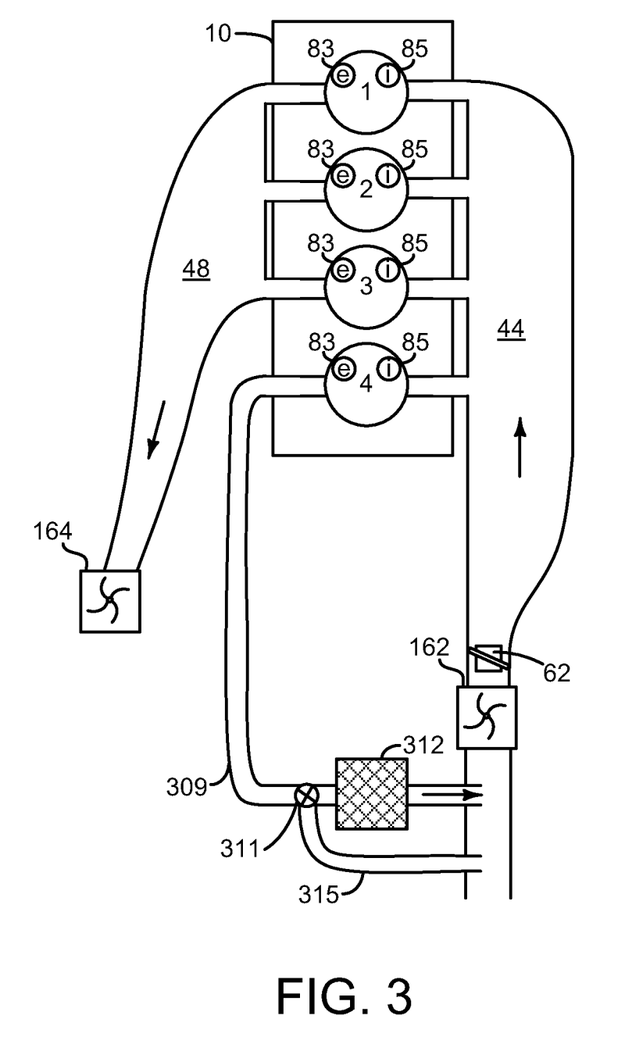
Figure 4:
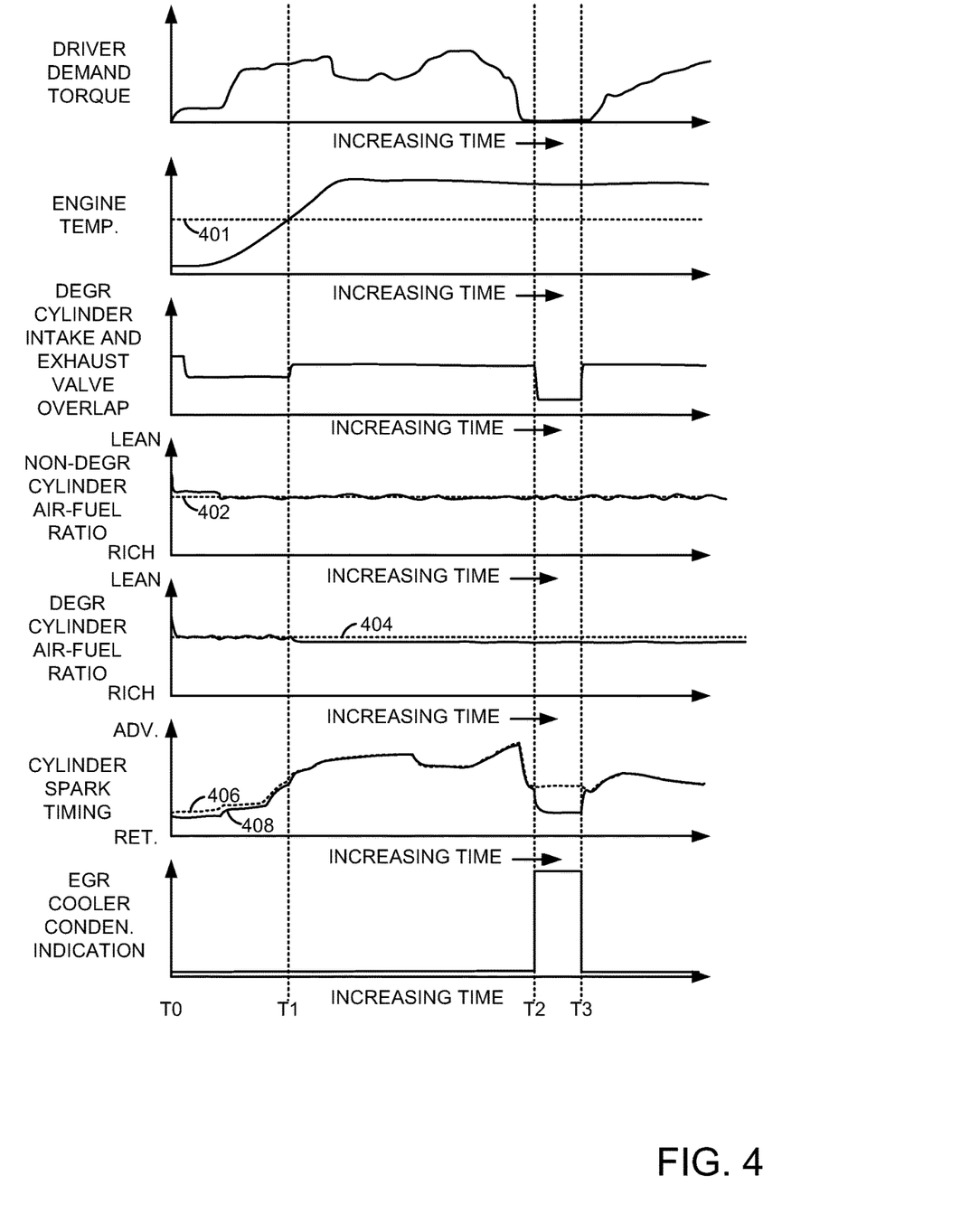
FIG. 4 is an example engine operating sequence according to the method of FIG. 5.

The present description is related to operating an engine with highly diluted cylinder mixtures. The engine cylinder mixtures may be diluted using recirculated exhaust gases that are byproducts of combusting air-fuel mixtures. The recirculated exhaust gases may be referred to as EGR. FIGS. 1-3 show example engine configurations that may be operated at higher cylinder charge dilution levels to improve engine efficiency and emissions. The engine may operate as shown in the sequence of FIG. 4 according to the method shown in FIG. 5.

Referring to FIG. 1, internal combustion engine 10, comprising a plurality of cylinders as shown in FIGS. 2 and 3, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated independently with respect to valves of other cylinders via intake cam 51 and an exhaust cam 53. Intake valve adjuster 85 advances or retards the phase of intake valve 52 relative to a position of crankshaft 40. Additionally, intake valve adjuster 85 may increase or decrease an intake valve lift amount. Exhaust valve adjuster 83 advances or retards the phase of exhaust valve 54 relative to a position of crankshaft 40. Further, exhaust valve adjuster 83 may increase or decrease an exhaust valve lift amount.

The position of intake cam 51 may be determined by intake cam sensor 55. The position of exhaust cam 53 may be determined by exhaust cam sensor 57. In cases where combustion chamber 30 is part of a DEGR cylinder, the timing and/or lift amount of valves 52 and 54 may be adjusted independently of valves in other engine cylinders so that the cylinder air charge of the DEGR cylinder may be increased or decreased relative to cylinder air charge of other engine cylinders during a same engine cycle. In this way, external EGR supplied to engine cylinders may exceed twenty five percent of the cylinder charge mass for a four cylinder engine including a sole DEGR cylinder. Further, the internal EGR amounts of cylinders other than the DEGR cylinder may be adjusted independently of the DEGR cylinder by adjusting valve timing of those respective cylinders. In some examples, an engine may include two or more DEGR cylinders. For example, an eight cylinder engine may include a DEGR cylinder for each cylinder bank.

Fuel injector 66 is shown positioned to inject fuel directly into cylinder 30, which is known to those skilled in the art as direct injection. Alternatively, fuel may be injected to an intake port, which is known to those skilled in the art as port injection. Intake manifold 44 is shown communicating with optional electronic throttle 62 which adjusts a position of throttle plate 64 to control air flow from boost chamber 46 to intake manifold 44. In some examples, throttle 62 and throttle plate 64 may be positioned between intake valve 52 and intake manifold 44 such that throttle 62 is a port throttle. Compressor 162 supplies air from air intake 42 to boost chamber 46. Compressor 162 is driven by shaft 161 which is mechanically coupled to turbine 164. Compressor recirculation valve 158 may be selectively operated to reduce boost pressure. Waste gate 72 may be selectively opened and closed to control the speed of turbine 164.

Driver demand torque may be determined from a position of accelerator pedal 130 as sensed by accelerator pedal sensor 134. A voltage or current indicative of driver demand torque is output from accelerator pedal sensor 134 when driver's foot 132 operates accelerator pedal 130.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of turbine 164 and catalytic converter 70. Alternatively, a two-state exhaust gas oxygen sensor may be substituted for UEGO sensor 126. Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only (non-transitory) memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 121 coupled to intake manifold 44; a measurement of boost pressure from pressure sensor 122; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC).

In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative intake and exhaust valve opening overlap, late intake valve closing, or various other examples.

FIG. 2 shows a schematic of a first example of engine 10 showing cylinders 1-4, one of which includes combustion chamber 30 of FIG. 1. The example engine configuration of FIG. 2 may include the devices shown in FIG. 1 for each engine cylinder. The intake valves 52 and exhaust valves 54 of each cylinder may be opened and closed independently of valves of other engine cylinders via intake valve adjuster 85 and exhaust valve adjuster 83. For example, intake 52 and exhaust 54 valves of cylinder number four may be opened and closed at different timings relative to engine crankshaft 40 and other engine cylinder valves. Thus, intake valve 52 of cylinder number four may be closed twenty five engine rotation degrees after BDC intake stroke of cylinder number four. On the other hand, during the same engine cycle, the intake valve of cylinder number one may close five degrees after BDC intake stroke of cylinder number one. Further, the engine configuration of FIG. 2 may be operated according to the method of FIG. 5.

Throttle 62 regulates air flow into intake manifold 44, and intake manifold 44 supplies air to each of cylinders 1-4. Intake valves 52 and exhaust valves 54 of one cylinder in the group of cylinders 1-4 may be operated at different timings with respect to valve timing of other cylinders in the group of cylinders 1-4. In one example, valves of cylinders 1-3 operate at a same timing, but valves of cylinder 4 operate at a different timing and/or same timing as valves for cylinders 1-3. For example, the intake valves of a cylinder in the group of cylinders 1-3 may close at 10 crankshaft degrees after bottom dead center intake stroke of the cylinder where the intake valve is closing for a particular engine cycle. On the other hand, the intake valves of cylinder 4 may close at 20 crankshaft degrees after bottom dead center intake stroke of cylinder 4 for the same engine cycle. In some examples, an air charge cooler (not shown) may be placed between compressor 162 and throttle 62.

Exhaust from cylinders 1-3 is directed to exhaust manifold 48 before being processed by a catalyst. Exhaust from cylinder 4 is routed to intake manifold 44 via DEGR cylinder bypass valve 205 and passage 209, or alternatively, to exhaust manifold 48 via DEGR cylinder bypass valve 205 and passage 206. In some examples, DEGR cylinder bypass valve 205 and passage 206 may be omitted. Exhaust gas from cylinder 4 may be routed from passage 209 to EGR cooler 212 or to EGR cooler bypass passage 215 via EGR cooler bypass valve 211. EGR cooler 212 may reduce a temperature of EGR from the DEGR cylinder during middle to higher engine load conditions to reduce the possibility of engine knocking.

Each of cylinders 1-4 may include internal EGR via trapping exhaust gases from a combustion event in the respective cylinder and allowing the exhaust gases to remain in the respective cylinder during a subsequent combustion event. The amount of internal EGR may be varied via adjusting intake and exhaust valve opening and/or closing times, for example by adjusting the amount of valve overlap (e.g., a duration where intake and exhaust valves of a cylinder are simultaneously open). By increasing intake and exhaust valve opening overlap, additional EGR may be retained in the cylinder during a subsequent combustion event when exhaust manifold pressure is higher than intake manifold pressure. Further, decreasing intake valve and exhaust valve overlap may decrease cylinder charge temperatures and increase cylinder exhaust gas temperatures. Increasing intake valve and exhaust valve overlap may increase cylinder charge temperature and decrease cylinder exhaust gas temperature. In this example, external EGR is provided to cylinders 1-4 solely via cylinder 4 exhaust and passage 209. External EGR is not provided by exhaust flow from cylinders 1-3. Thus, in this example, cylinder 4 is the sole source of external EGR for engine 10. However, in V configuration engines a cylinder on each cylinder bank may be a dedicated EGR cylinder. Passage 209 enters intake manifold 44 downstream of compressor 162. Exhaust gases from cylinders 1-3 rotate turbine 164, and exhaust gases from cylinder 4 may selectively rotate turbine 164 depending on an operating state of DEGR cylinder bypass valve 205.

Referring now to FIG. 3, a schematic of a second example of engine 10 showing cylinders 1-4 is shown. One of cylinders 1-4 includes combustion chamber 30 of FIG. 1, and the remaining cylinders may include similar devices. The example engine configuration of FIG. 3 may include the devices shown in FIG. 1 for each engine cylinder. The engine system shown in FIG. 3 also includes many of the same devices and components described in FIG. 2. Therefore, for the sake of brevity, the description of like devices and components is omitted. However, the devices and components operate and perform as described in FIG. 2.

In the example of FIG. 3, engine 10 includes passage 309 which does not communicate with exhaust manifold 48 and enters the engine upstream of compressor 162. EGR flow through passage 309 is adjusted via varying timing of intake valve adjuster 85 and exhaust valve adjuster 83 of cylinder 4. For example, EGR flow from cylinder 4 to cylinders 1-4 may be reduced via retarding intake valve closing (IVC) after BDC intake stroke cylinder 4. EGR flow from cylinder 4 to cylinders 1-4 may be increased via advancing IVC toward BDC intake stroke cylinder 4. Further, EGR flow from cylinder 4 to cylinders 1-4 may be reduced via retarding exhaust valve closing (EVC) from TDC exhaust stroke. EGR flow from cylinder 4 to cylinders 1-4 may be increased via advancing exhaust valve closing (EVC) toward TDC exhaust stroke. Exhaust gas from cylinder 4 may be routed from passage 309 to EGR cooler 312 or to EGR cooler bypass passage 315 via EGR cooler bypass valve 311. EGR cooler 312 may reduce a temperature of EGR from the DEGR cylinder during middle to higher engine load conditions to reduce the possibility of engine knocking.

Passage 309 may improve the possibility of increasing blow through (e.g., where contents of the intake manifold, such as air, is pushed through the cylinder while intake and exhaust valves of the cylinder are simultaneously open during a cylinder cycle) for cylinder 4 when intake manifold pressure is higher than pressure upstream of compressor 162. Rather than being routed downstream of compressor 162, exhaust gases are routed upstream of compressor 162 where they may be exposed to pressure that is lower than intake manifold pressure. EGR that flows through passage 309 enters intake manifold 44 after it is compressed via compressor 162.

Thus, the system of FIGS. 1-3 provides for a vehicle system, comprising: an engine; a first variable valve adjustment device coupled to the engine and operating valves of a first cylinder; a second variable valve adjustment device coupled to the engine and operating valves of a second cylinder; a passage fluidly coupling the exhaust side of the first cylinder to an air intake of the engine, the passage not fluidly coupling the exhaust side of other engine cylinders to the air intake; and a controller including non-transitory instructions for transitioning from combusting a rich air-fuel mixture in the first cylinder to combusting a stoichiometric air-fuel ratio in the first cylinder in response to a request to increase a temperature of EGR gas.

The system of FIGS. 1-3 also provides for additional instructions for maintaining a stoichiometric air-fuel ratio in the second cylinder. The vehicle system further comprises an exhaust passage leading from the second cylinder to atmosphere, the exhaust passage not in fluidic communication with the first cylinder. The vehicle system includes where the passage enters the air intake upstream of a throttle and compressor. The vehicle system further comprises an EGR cooler and additional instructions to increase exhaust gas temperature exiting the first cylinder without additional instructions to increase exhaust gas temperature exiting the second cylinder. The vehicle system further comprises instructions to bypass exhaust gases from the first cylinder around the EGR cooler.

Figure 5:
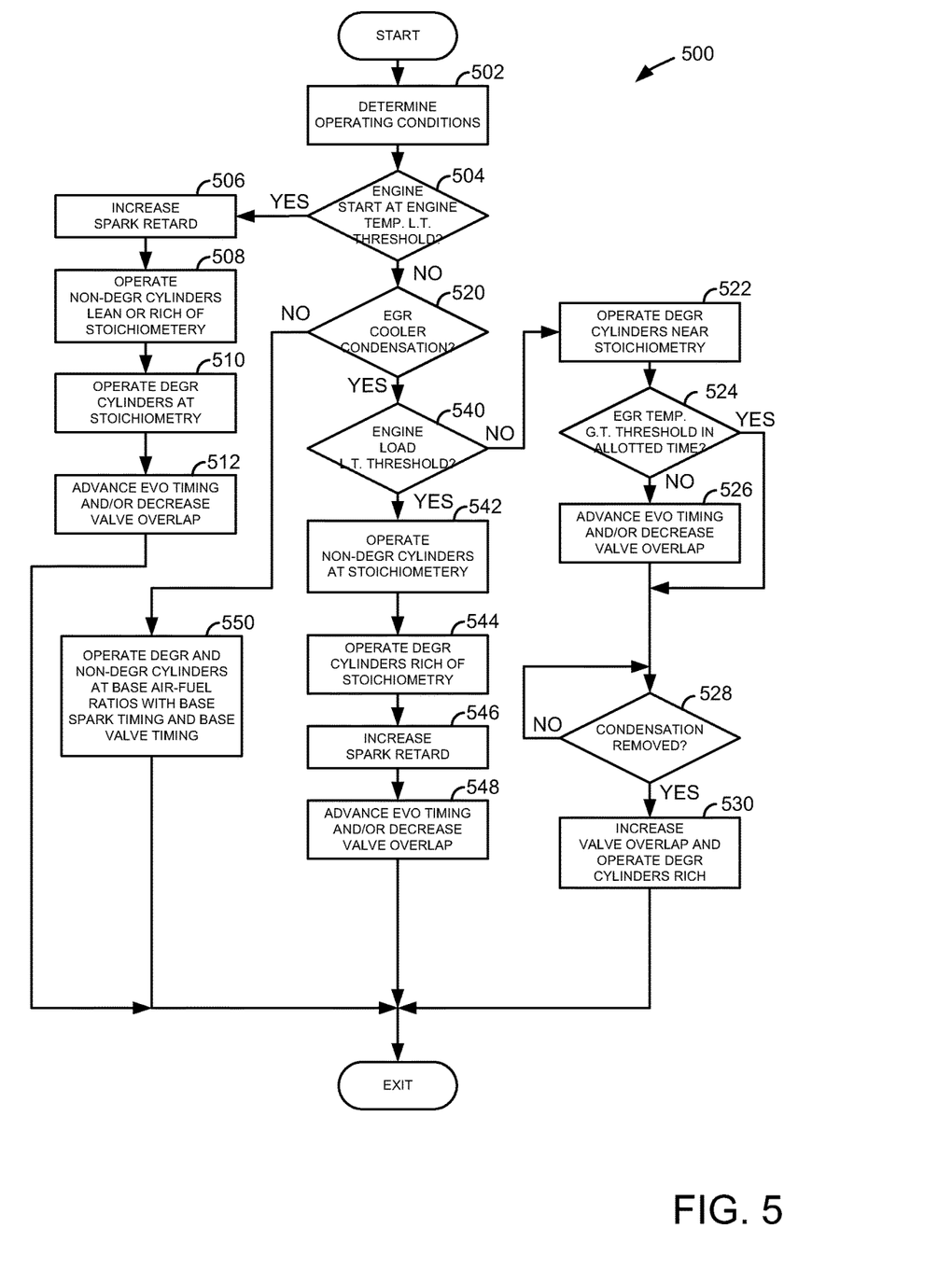
FIG. 5 shows an example method for operating an engine that includes a DEGR cylinder.

Referring now to FIG. 4, an example engine operating sequence according to the method of FIG. 5 and the system of FIGS. 1-3 is shown. The sequence of FIG. 4 is merely one example simulated sequence that may be provided by the method of FIG. 5.

The first plot from the top of FIG. 4 is a plot of driver demand torque versus time. The Y axis represents driver demand torque and driver demand torque increases in the direction of the Y axis arrow. The X axis represents time and time increases from the left side of FIG. 4 to the right side of FIG. 4. Driver demand torque may be determined from accelerator pedal position.

The second plot from the top of FIG. 4 is a plot of engine temperature versus time. The Y axis represents engine temperature and engine temperature increases in the direction of the Y axis arrow. The X axis represents time and time increases from the left side of FIG. 4 to the right side of FIG.

4. Horizontal line 401 represents a threshold engine temperature where the engine is determined to be warm.

The third plot from the top of FIG. 4 is a plot of engine intake and exhaust valve overlap (e.g., when intake valves and exhaust valves are simultaneously open) for the DEGR cylinder. Valve overlap increases in the direction of the Y axis arrow and is zero at the X axis level. The X axis represents time and time increases from the left side of FIG. 4 to the right side of FIG. 4.

The fourth plot from the top of FIG. 4 is a plot of cylinder air-fuel ratio for non-DEGR cylinders versus time. The Y axis represents cylinder air-fuel ratio for non-DEGR cylinders. Horizontal line 402 represents a stoichiometric air-fuel ratio. The engine cylinders are injected with a lean mixture when the trace is above horizontal line 402, and the engine cylinders are injected with a rich mixture when the trace is below horizontal line 402. The X axis represents time and time increases from the left side of FIG. 4 to the right side of FIG. 4.

The fifth plot from the top of FIG. 4 is a plot of cylinder air-fuel ratio for a DEGR cylinder versus time. The Y axis represents cylinder air-fuel ratio for the DEGR cylinder. Horizontal line 404 represents a stoichiometric air-fuel ratio. The DEGR cylinder is operating with a lean mixture when the trace is above horizontal line 404, and the DEGR engine cylinder is operating with a rich mixture when the trace is below horizontal line 404. The X axis represents time and time increases from the left side of FIG. 4 to the right side of FIG. 4.

The sixth plot from the top of FIG. 4 is a plot of DEGR cylinder spark timing and non-DEGR spark timing versus time. The Y axis represents cylinder spark timing and cylinder spark timing advances in the direction of the Y axis arrow. The X axis represents time and time increases from the left side of FIG. 4 to the right side of FIG. 4. Dashed line 406 represents spark timing for non-DEGR cylinders. Solid line 408 represents spark timing for DEGR cylinders. Spark timing for non-DEGR cylinders matched spark timing for DEGR cylinder when only solid line 408 is visible.

The seventh plot from the top of FIG. 4 is a plot of a variable that indicates the presence or absence of EGR cooler condensation versus time. The Y axis represents a level of the variable that indicates EGR cooler condensation. EGR cooler condensation is indicated when the trace is at a higher level near the Y axis arrow level. The X axis represents time and time increases from the left side of FIG. 4 to the right side of FIG. 4.

At time T0, the engine is not operating and the driver demand torque is zero. The driver demand torque includes any input by the driver to the accelerator pedal as well as any internal controller requested torque such as torque to operate the engine at an elevated idle speed. The engine temperature is low and the exhaust valve overlap is at a middle level. No EGR cooler condensation is indicated.

Between time T0 and time T1, the engine is started and the driver demand torque is increased to operate the engine at a higher idle speed. By operating the engine at a higher idle speed, the engine may be warmed more quickly. The engine temperature begins to increase in response to starting the engine. The non-DEGR cylinders are operated lean and transition to stoichiometric operation. The DEGR cylinder is operated near a stoichiometric air-fuel ratio (e.g., 0.5 air-fuel ratio rich of stoichiometric conditions). By operating the DEGR cylinder near stoichiometric conditions, EGR temperature may be increased while combustion stability may be increased as compared to if the DEGR cylinder where operating lean. The non-DEGR cylinders are operated lean to decrease hydrocarbons in the exhaust gases. The DEGR cylinder and the non-DEGR cylinders are operated at a retarded spark timing to increase engine temperature and EGR temperature. The DEGR cylinder's spark timing is more retarded than the non-DEGR cylinders and the spark timing advances as engine temperature increases. The DEGR cylinder intake and exhaust overlap is decreased after the DEGR air-fuel ratio is stoichiometric so that EGR temperature may be further increased. There is no indication of EGR cooler condensation. Driver demand torque follows driver demand. In examples where the system includes a bypass valve (e.g., 205 of FIG. 2), the bypass valve is open while spark timing is retarded.

At time T1, engine temperature reaches threshold temperature 401 and the intake and exhaust valve overlap is increased in response to the engine reaching a desired temperature. Further, the DEGR cylinder's air-fuel ratio is richened to improve engine combustion stability. DEGR and non-DEGR cylinder spark timing advances as the engine temperature increases and there is no indication of EGR cooler condensation. Driver demand torque follows driver demand and the non-DEGR cylinders operate with a stoichiometric air-fuel ratio.

Between time T1 and time T2, driver demand torque follows driver demand and engine temperature remains warm. DEGR cylinder intake and exhaust valve overlap remains longer in duration and the DEGR cylinder operates rich of stoichiometry to improve engine combustion stability as the engine operates at higher EGR dilution levels. EGR cooler condensation is not indicated. Near time T2 the driver demand torque is reduced allowing the exhaust gas temperatures to be reduced.

At time T2, EGR cooler condensation is indicated by the EGR cooler condensation variable transitioning to a higher level. EGR cooler condensation may be determined via a sensor (e.g., a humidity sensor) or inferred from engine operating conditions. Condensation may increase the probability of engine misfire by inducting water droplets and/or water vapor into the engine from the EGR cooler. The engine is operating at idle conditions where there is an opportunity to retard spark timing without the driver perceiving a loss of engine power to increase exhaust gas temperature from the DEGR cylinder so that condensation may be purged from the EGR cooler. Therefore, spark timing in the DEGR cylinder is retarded further to increase the temperature of exhaust gases exiting the DEGR cylinder and entering the EGR cooler.

The warmer EGR gases begin to vaporize any water or condensation in the EGR cooler. If the system is equipped with an EGR cooler bypass valve (e.g., 211 or 311), the valve may be positioned to allow EGR to flow through the EGR cooler when condensation is present in the EGR cooler and positioned to allow EGR to flow around the EGR cooler when engine temperature is less than a threshold temperature. Spark timing in the non-DEGR cylinders remains at a more advanced timing as compared to spark timing for the DEGR cylinder. The intake and exhaust valve overlap is decreased to further increase exhaust gas temperature in the DEGR cylinder. In some examples, the exhaust valve opening (EVO) time may be advanced to increase temperature of exhaust gases exiting the DEGR cylinder instead of decreasing intake and exhaust valve overlap. The DEGR cylinder continues to operate with a rich air-fuel mixture so that combustion stability may be improved in the non-DEGR cylinders. The non-DEGR cylinders are fueled slightly lean of stoichiometry to provide an overall stoichiometric mixture in non-DEGR cylinders. Engine temperature remains at a warmer level.

At time T3, the EGR cooler condensation indication variable changes state to a lower level to indicate the absence of condensation in the EGR cooler. The DEGR cylinder spark timing is advanced and the intake and exhaust valve overlap is increased in response to the absence of indicated EGR condensation. The DEGR cylinder continues to operate with a rich air-fuel mixture and the non-DEGR cylinders continue to operate slightly lean of stoichiometry.

In this way, temperature of exhaust gases exiting the DEGR cylinder may be increased to warm the engine and reduce EGR cooler condensation without simultaneously taking action in non-DEGR cylinders to increase their exhaust gas temperatures. Further, exhaust gas temperature may be increased in the DEGR cylinder during low engine load conditions, such as idle, to increase engine fuel economy by decreasing engine pumping work.

Referring now to FIG. 5, a method for operating an engine that includes at least one DEGR cylinder is shown. The method of FIG. 5 may be stored as executable instructions in non-transitory memory of controller 12 shown in FIG. 1. Further, the method of FIG. 5 may provide the operating sequence shown in FIG. 4.

At 502, method 500 determines engine operating conditions. Engine operating conditions may include but are not limited to engine speed, engine load, driver demand torque, EGR cooler condensation, and engine temperature. Method 500 proceeds to 504 after engine operating conditions are determined.

At 504, method 500 judges if the engine is being started at an engine temperature less than (L.T.) a threshold temperature. The engine starting period may go on from engine cranking until the engine reaches a threshold temperature or amount of time since engine stop. Engine temperature may be determined via a temperature sensor and engine starting may be determined based on engine speed. If method 500 judges that the engine is being started at a temperature less than a threshold temperature, the answer is yes and method 500 proceeds to 506. Otherwise, the answer is no and method 500 proceeds to 520.

At 506, method 500 retards spark timing from baseline spark timing (e.g., spark timing for a warmed up engine at similar engine speed and load). For example, if at engine idle and the engine is warm, spark timing may be 15 degrees before top-dead-center (BTDC) compression stroke. Spark timing may be adjusted to 5 degrees after top-dead-center (ATDC) compression stroke during a cold engine start (e.g., 18° C.). By retarding spark timing engine heating may be increased and hydrocarbon emissions may be reduced. Further, if the system includes a bypass valve (e.g., 205 of FIG. 2) the bypass valve may be opened to allow exhaust from the DEGR cylinder to flow to atmosphere instead of being directed to the engine intake. The bypass valve is closed if engine temperature is greater than the threshold temperature. Method 500 proceeds to 508 after spark timing is retarded from baseline spark timing.

At 508, method 500 operates non-DEGR cylinders lean or rich of stoichiometry. If the engine is being started at an elevated temperature that is less than warm engine operating temperature (e.g., greater than 40° C.) and catalyst temperature is warm, the engine may be operated slightly rich to reduce NOx emissions. If the engine is cool started (e.g., at a temperature less than 40° C., but greater than 10° C.), the non-DEGR cylinders may be operated lean of stoichiometry to reduce hydrocarbon emissions. Method 500 proceeds to 510 after non-DEGR cylinder air-fuel ratios are established and output.

At 510, method 500 operates DEGR cylinders substantially at stoichiometry (e.g., within ±3 percent). By operating the DEGR cylinders at stoichiometry, exhaust gas temperature from the DEGR cylinders may increase. Method 500 proceeds to 512 after DEGR cylinders are operated at stoichiometry.

At 512, method 500 advances exhaust valve opening time and/or decreases intake and exhaust valve overlap for the DEGR cylinders. By opening the exhaust valves early, less expansion work is performed by the exhaust gases, thereby allowing the exhaust gases to exit the DEGR cylinders at higher temperatures. Decreasing the intake and exhaust valve overlap decreases internal EGR within the DEGR cylinder and increases exhaust gas temperature via reducing cylinder charge dilution. Method 500 proceeds to exit after EVO and/or overlap are adjusted.

Thus, during cool engine starting conditions, DEGR cylinder spark timing may be retarded to provide more retarded spark timing than non-DEGR cylinders and higher exhaust gas temperatures. Additionally, DEGR cylinders may be operated lean to increase exhaust gas temperatures. Further, valve timing may be adjusted to increase temperature of exhaust gases flowing from DEGR cylinders to increase EGR temperature. The higher EGR temperature may help to warm the engine faster.

At 520, method 500 judges if there is EGR condensation. EGR condensation may be determined via a sensor (e.g., humidity sensor) or via inference. If method 500 judges that condensation is present, the answer is yes and method 500 proceeds to 540. Otherwise, the answer is no and method 500 proceeds to 550.

Alternatively, if the system includes a water-gas shift catalyst instead of an EGR cooler, method 500 judges if there is condensation at the water-gas shift catalyst via a sensor or inference. If method 500 judges that condensation is present, the answer is yes and method 500 proceeds to 540. Otherwise, the answer is no and method 500 proceeds to 550

At 550, method 500 operates DEGR cylinders and non-DEGR cylinders at base air-fuel ratios, spark timing, and valve timings. The DEGR cylinder air-fuel ratio may be rich and the non-DEGR cylinder air-fuel ratio may be stoichiometric at baseline conditions. The DEGR and non-DEGR cylinder spark timings may be the same at baseline conditions. The DEGR and non-DEGR cylinder may have the same or different valve timings at baseline conditions. Method 500 proceeds to exit after air-fuel ratio, spark timing, and valve timing are adjusted.

At 540, method 500 judges if engine load is less than (L.T.) a threshold engine load. Additionally, method 500 may judge if engine speed is less than a threshold speed. If method 500 judges that engine load and/or speed are less than threshold values, the answer is yes and method 500 proceeds to 542. Otherwise, the answer is no and method 500 proceeds to 522.

At 522, method 500 operates DEGR cylinders near stoichiometric air-fuel ratio (e.g., from 0.5 air-fuel ratio rich of stoichiometry to stoichiometric conditions) in response to condensation in the EGR cooler or water-gas catalyst. By operating the DEGR cylinders near a stoichiometric air-fuel ratio, temperature of exhaust gases flowing from the DEGR cylinder to the EGR cooler or water-gas catalyst may be increased so as to vaporize condensed water in the EGR cooler or water-gas catalyst. The vaporized water may then be inducted into the engine at a rate that lowers the possibility of engine misfire. Fuel supplied to the non-DEGR cylinders may be adjusted to maintain non-DEGR cylinders at stoichiometric conditions. For example, if the DEGR cylinder is adjusted from a rich air-fuel mixture to a lean air-fuel mixture, fuel supplied to the non-DEGR cylinders may be increased so as to maintain the DEGR cylinders at stoichiometric conditions. Method 500 proceeds to 524 after beginning to operate the DEGR cylinders with a stoichiometric air-fuel ratio.

At 524, method 500 judges if EGR temperature entering the EGR cooler or water-gas catalyst is greater than (G.T.) a threshold temperature (e.g., 100° C.) within a threshold amount of time. The EGR temperature may be inferred or sensed. If method 500 judges that EGR temperature is greater than the threshold temperature in an allotted amount of time, the answer is yes and method 500 proceeds to 528. Otherwise, the answer is no and method 500 proceeds to 526.

At 526, method 500 advances exhaust valve opening time and/or decreases intake and exhaust valve overlap for the DEGR cylinders. By opening the exhaust valves early, less expansion work is performed by the exhaust gases, thereby allowing the exhaust gases to exit the DEGR cylinders at higher temperatures. Decreasing the intake and exhaust valve overlap decreases internal EGR within the DEGR cylinder and increases exhaust gas temperature via reducing cylinder charge dilution. Valve timing of non-DEGR cylinders may not be adjusted in response to increasing EGR gas temperature. Method 500 proceeds to 528 after EVO and/or overlap are adjusted.

At 528, method 500 judges if EGR condensation is removed. In one example, method 500 may judge EGR condensation is removed based on output of a sensor. In other examples, EGR condensation amount may be inferred. If method 500 judges that EGR condensation is removed, the answer is yes and method 500 proceeds to 530. Otherwise, the answer is no and method 500 returns to 528.

At 530, method 500 increases intake and exhaust valve overlap, retards EVO timing, and/or operates DEGR cylinders with a rich air-fuel ratio. In other words, method 500 returns valve timing and air-fuel ratio of DEGR cylinders back to baseline values. The DEGR cylinder is operated rich to provide hydrogen to non-DEGR cylinders, thereby improving combustion stability at higher EGR flow rates. Method 500 proceeds to exit after DEGR cylinder air-fuel ratio and valve timings are returned to base values.

In this way, DEGR cylinder air-fuel ratio and valve timing may be adjusted to increase temperature of exhaust gases exiting the DEGR cylinder so that EGR cooler or water-gas catalyst condensation may be reduced. If the engine is not operating at a middle or higher engine load, DEGR cylinder exhaust gas temperature may be increased via retarding spark. However, at higher engine loads, method 500 does not retard spark timing in response to EGR condensation to increase EGR temperature. The engine load, DEGR cylinder air-fuel ratio, and valve timing may be sufficient to produce higher exhaust temperatures from the DEGR cylinder. Thus, engine performance may not be reduced to increase exhaust gas temperature via spark retard.

At 542, method 500 operates non-DEGR cylinders with a stoichiometric air-fuel ratio. The non-DEGR cylinders may be operated about a stoichiometric air-fuel ratio (e.g., within ±0.5 air-fuel ratio of a stoichiometric air-fuel ratio) to improve catalyst efficiency. Method 500 proceeds to 544 after non-DEGR cylinder air-fuel ratio is adjusted.

At 544, method 500 operates DEGR cylinders at an air-fuel ratio that is rich of stoichiometry. The DEGR cylinder is operated rich to provide hydrogen to the non-DEGR cylinders which may improve combustion stability when the engine is operating at light loads with a relatively high EGR concentration. Method 500 proceeds to 546 after adjusting the air-fuel ratio of the DEGR cylinder.

At 546, method 500 increases spark retard of the DEGR cylinder. By increasing spark retard, combustion in the cylinder is delayed so that cylinder's air-fuel mixture oxidizes later in the combustion cycle, thereby reducing mechanical work produced by the DEGR cylinder and increasing exhaust gas temperature. The higher exhaust gas temperature allows the engine throttle to be opened further without increasing engine torque since the warmed EGR displaces additional air from the engine cylinders. Consequently, engine pumping work may be reduced and engine efficiency may be increased. Spark timing of non-DEGR cylinders may remain at baseline spark timing. Method 500 proceeds to 548 after spark timing is adjusted.

At 548, method 500 advances exhaust valve opening time and/or decreases intake and exhaust valve overlap for the DEGR cylinders. By opening the exhaust valves early, less expansion work is performed by the exhaust gases, thereby allowing the exhaust gases to exit the DEGR cylinders at higher temperatures. Decreasing the intake and exhaust valve overlap decreases internal EGR within the DEGR cylinder and increases exhaust gas temperature via reducing cylinder charge dilution. Method 500 proceeds to exit after EVO and/or overlap are adjusted.

In this way, air-fuel ratios of DEGR and non-DEGR cylinders may be adjusted to increase EGR gas temperature for improving engine efficiency and emissions. Further, valve timing and spark timing may be adjusted to increase EGR temperature. Further still, adjustments to valve timing of non-DEGR cylinders may not be adjusted so as to maintain exhaust gas temperature and combustion properties of non-DEGR cylinders when valve timing of DEGR cylinders is adjusted to increase EGR gas temperature. Additionally, the cylinder air amount of the DEGR cylinder may be increased when spark timing of the DEGR cylinder is retarded to maintain torque supplied by the DEGR cylinder.

Thus, the method of FIG. 5 provides for a method for an engine, comprising: recirculating exhaust gas from only a dedicated EGR cylinder to an intake of engine cylinders; increasing EGR temperature in the dedicated EGR cylinder via increasing an air-fuel ratio of the dedicated EGR cylinder in response to EGR cooler condensation; and decreasing an air-fuel ratio of the remaining engine cylinders (e.g., non-dedicated EGR cylinders) in response to the EGR cooler condensation. The method further comprises advancing exhaust valve opening timing of the dedicated EGR cylinder without advancing exhaust valve opening timing of the remaining engine cylinders. The method further comprises decreasing intake and exhaust valve opening overlap of the dedicated EGR cylinder without decreasing intake and exhaust opening overlap of the remaining engine cylinders.

In some examples, the method includes where the dedicated EGR cylinder provides exhaust gas to the cylinders upstream of a compressor. The method includes where the dedicated EGR cylinder provides exhaust gas to the remaining cylinders downstream of the compressor. The method also includes where the air-fuel ratio of the dedicated EGR cylinder is made leaner via increasing the air-fuel ratio of the dedicated EGR cylinder, and where the air-fuel ratio of the remaining engine cylinders (e.g., non-dedicated EGR cylinders) is made richer via decreasing the air-fuel ratio of remaining engine cylinders.

The method of FIG. 5 also provides for a method for an engine, comprising: recirculating exhaust gas from only a subset of engine cylinders to an intake of engine cylinders; increasing EGR gas temperature by first retarding spark timing and then by adjusting valve timing during a first mode; and increasing EGR gas temperature by first increasing an air-fuel ratio of the subset of engine cylinders and then by adjusting valve timing of the subset of engine cylinders during a second mode, the second mode different than the first mode. The method includes where the first mode is during an engine start when the engine is not fully warm. The method includes where the second mode is during condensation purging of an EGR cooler.

In some examples, the method includes where adjusting valve timing includes advancing exhaust valve opening time. The method also includes where adjusting valve timing includes increasing intake and exhaust valve overlap. The method further comprises decreasing an air-fuel ratio of the remaining engine cylinders during the second mode. The method includes where an air-fuel ratio of the remaining engine cylinders is stoichiometric. The method includes where the subset of engine cylinders are operated with a stoichiometric air-fuel ratio.

As will be appreciated by one of ordinary skill in the art, method described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine with exhaust gas recirculation (EGR), comprising:
    recirculating exhaust gas from only a dedicated EGR cylinder to an intake of engine cylinders via control by a controller;
    increasing EGR temperature in the dedicated EGR cylinder via increasing an air-fuel ratio of the dedicated EGR cylinder via control by the controller in response to EGR cooler condensation; and
    operating remaining engine cylinders via control by the controller about a stoichiometric air-fuel ratio in response to the EGR cooler condensation.

2. The method of claim 1, further comprising advancing exhaust valve opening timing of the dedicated EGR cylinder without advancing exhaust valve opening timing of the remaining engine cylinders.

3. The method of claim 1, further comprising decreasing intake and exhaust valve opening overlap of the dedicated EGR cylinder without decreasing intake and exhaust opening overlap of the remaining engine cylinders.

4. The method of claim 1, where the dedicated EGR cylinder provides exhaust gas to cylinders upstream of a throttle and compressor.

5. The method of claim 1, where the dedicated EGR cylinder provides exhaust gas to cylinders downstream of a compressor.

6. The method of claim 1, where the air-fuel ratio of the dedicated EGR cylinder is made leaner via increasing the air-fuel ratio of the dedicated EGR cylinder, and where the air-fuel ratio of the remaining engine cylinders is maintained about stoichiometric conditions.

* * * * *